No. 784,853.                                                                                       Patented March 14, 1905.

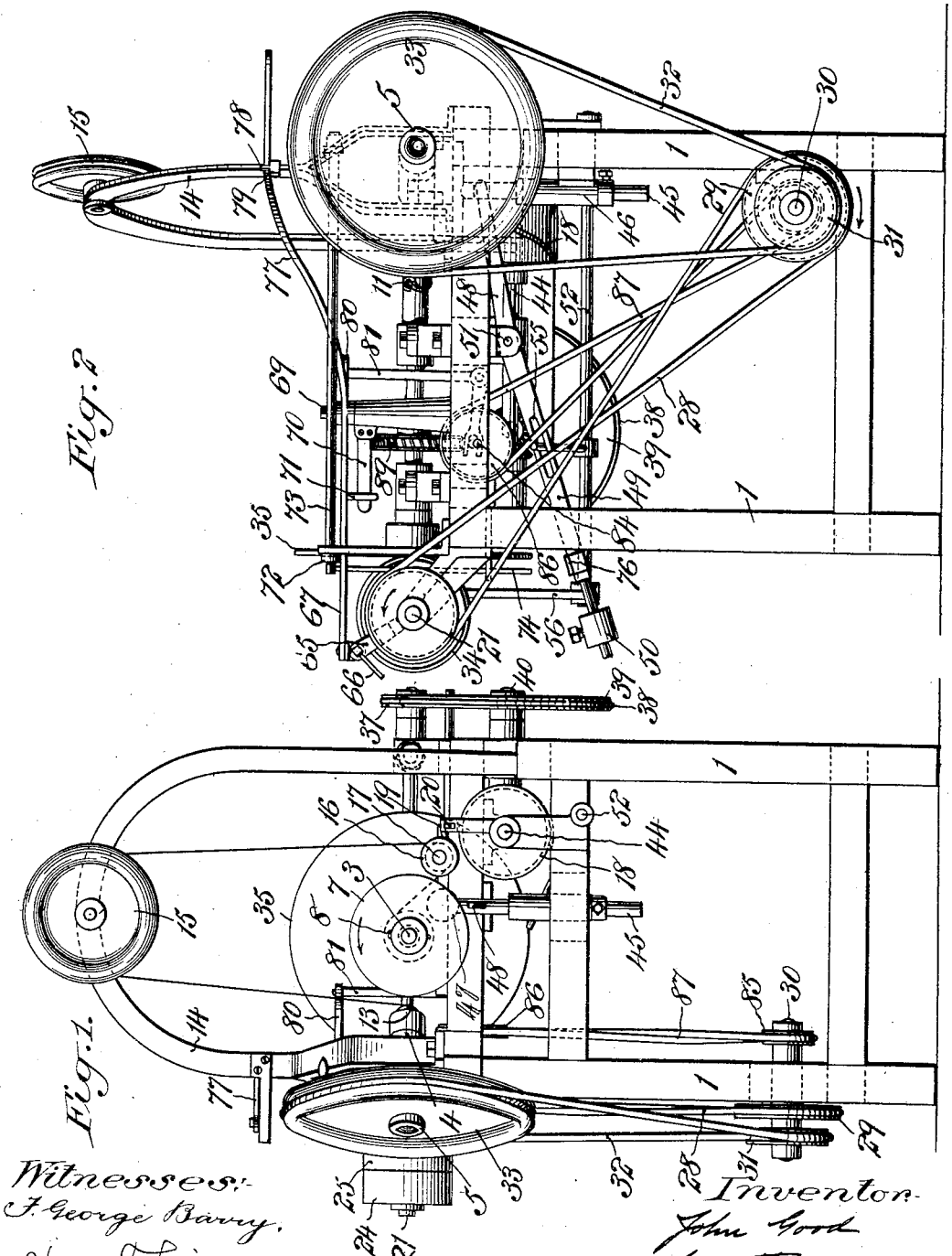

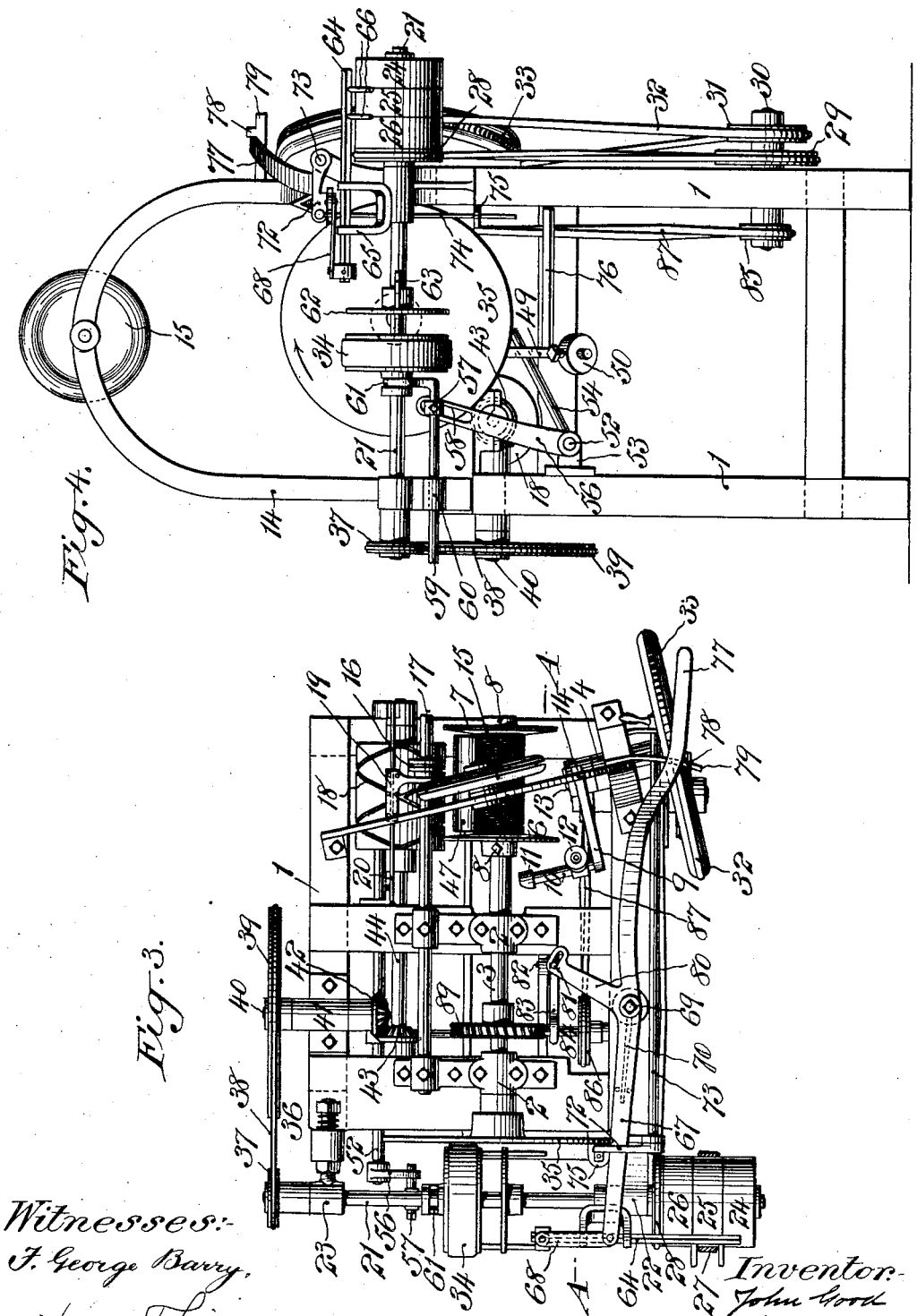

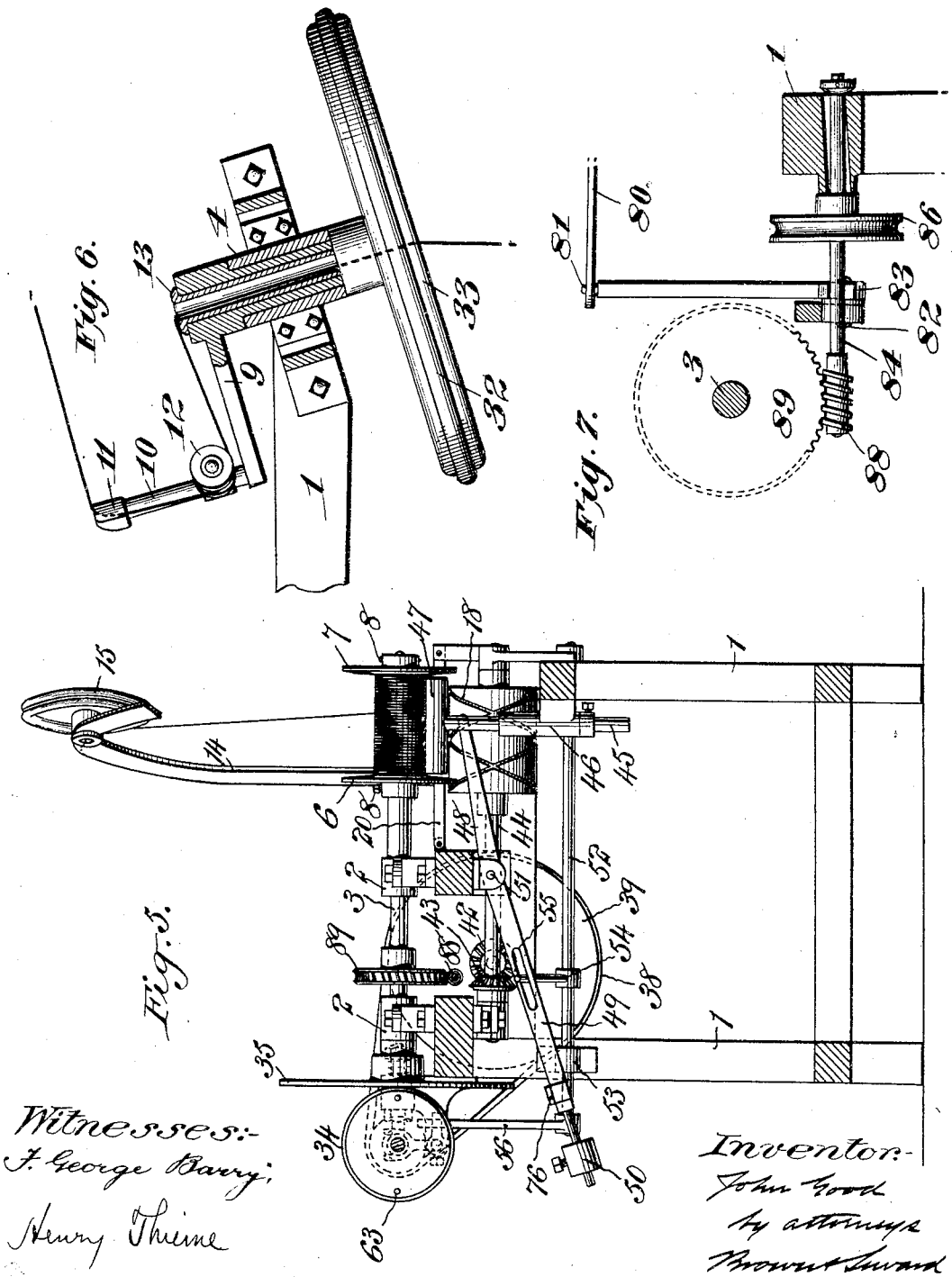

UNITED STATES PATENT OFFICE.

JOHN GOOD, OF NEW YORK, N. Y., ASSIGNOR, BY DIRECT AND MESNE ASSIGNMENTS, TO THE JOHN GOOD CORDAGE CO., A CORPORATION OF NEW YORK.

BALLING-MACHINE.

SPECIFICATION forming part of Letters Patent No. 784,853, dated March 14, 1905.

Application filed May 7, 1904. Serial No. 206,851.

*To all whom it may concern:*

Be it known that I, JOHN GOOD, a citizen of the United States, and a resident of the borough of Manhattan, in the city and State of New York, have invented a new and useful Improvement in Balling-Machines, of which the following is a specification.

My invention relates to an improvement in balling-machines, and has more particularly for its object to provide certain improvements in the construction, form, and arrangement of the several parts of a balling-machine whereby the ball is wound more expeditiously and compactly than heretofore, the parts being so arranged as to permit a ready shift from the longitudinal wind to the end wind.

A practical embodiment of my invention is represented in the accompanying drawings, in which—
Figure 1 is a front view of the machine. Fig. 2 is a side view. Fig. 3 is a top plan view. Fig. 4 is a back view. Fig. 5 is a vertical section taken from front to rear through the machine in the plane of the line A A of Fig. 3.
Fig. 6 is a view, on an enlarged scale, partially in section, of a part of the flier; and Fig. 7 is a detail view, on an enlarged scale, of the worm-shaft and its supports.

The machine-frame is denoted by 1, and it is provided with bearings 2 for the winding-spindle 3. This frame is further provided with a bearing 4 for the flier-spindle 5.

The winding-spindle upon which the twine, cord, or thread is wound to form the ball is furnished with inner and outer movable heads 6 and 7, which when fastened to the spindle by the set-screws 8 constitute, with the portion of the spindle between them, the equivalent of a spool or bobbin.
The flier-spindle 5 is hollow and carries a crank 9, on which is an arm 10, constituting what is known in spinning and winding machines as a "flier." This flier is arranged at one side of the winding-spindle 3, with the axis of its spindle 5 oblique to but in the same horizontal plane with the axis of the winding-spindle and in such position relative to the winding-spindle that the axis of said spindle 5 would intersect the axis of the winding-spindle at a point about midway of that part of the latter included between the heads 6 and 7 when the heads are in position thereon. The distance of the flier-spindle from the winding-spindle is such that the flier-arm 10 will rotate clear of the heads 6 and 7 of the winding-spindle. The distance of the flier-arm 10 from the axis of its spindle 5 is such that said arm 10 in its revolution may pass around and outside of the space included between the heads 6 and 7. The obliquity of the flier-spindle to the winding-spindle is such that the twine when engaged with the flier-spindle will be caused to pass around the ball endwise when the heads 6 and 7 are removed. This flier may be provided with a guide 11 at the end of its arm 10, a pulley 12 on the arm, and a guide 13 at the end of the hollow spindle 5, through which the twine is led.

A bracket 14 surmounts the frame 1, which bracket carries a guide-pulley 15, over which the twine is led when the longitudinal winding of the ball is being accomplished.

A guide-pulley 16 is mounted to rotate and to slide upon a guide-bar 17, secured to the frame parallel with the winding-spindle 3 and in proximity thereto. When the longitudinal winding of the ball is being accomplished, the twine is led from the pulley 15 down and around the pulley 16 and from thence onto the ball.

The movements of the guide-pulley 16 along the bar 17 are controlled by a traverse-cam 18, controlling a traveler 19 on a bar 20, parallel with the bar 17, which traveler 19 is engaged with the guide-pulley 16.

The mechanisms for controlling the winding of the ball are constructed, arranged, and operated as follows: A rotary drive-shaft 21 extends transversely across the back of the machine-frame and is mounted at one side of the machine in a bearing 22 and at the other side of the machine in a spring-actuated bearing 23. This shaft is provided with a fast pulley 24 and loose pulleys 25 and 26. The pulley 26 is provided with a surface for receiving the driving-belt 27 when shifted thereonto and also a surface which is at all times engaged by a driving-band 28, leading to a pulley 29 on a stud-shaft 30. This stud-shaft 30 is further provided with a pulley 31 around which a band 32 passes, which band leads to the driving-pulley 33 of the flier-spindle 5.

The drive-shaft 21 is provided intermediate its ends with a friction driving-wheel 34, the periphery of which is engaged with a friction-disk 35 on the rear end of the winding-spindle 3. This friction driving-wheel is held against the disk 35 by the spring 36 of the spring-actuated bearing 23 of the drive-shaft. The drive-shaft 21 is provided with a band-pulley 37, around which passes a band 38, which band leads to a pulley 39 on a stud-shaft 40, mounted in a suitable bearing 41 in the upper portion of the frame 1. This stud-shaft 40 is provided with a bevel-gear 42, which meshes with a bevel-gear 43 on the shaft 44 of the traverse-cam 18.

The means which I have shown for gradually lessening the speed of the winding-spindle as the size of the ball increases is constructed as follows: A rod 45 is mounted to slide vertically in a bearing 46 of the machine directly beneath the winding-spindle 3, the upper end of which shaft is provided with a head 47, which is held normally against the periphery of the ball as it is being wound by a weighted lever, one arm of which, 48, engages the rod 45, and the other end of which, 49, is provided with an adjustable weight 50 for adjusting the pressure of the head of the rod 45 against the ball. This weighted arm is pivoted at 51 to the machine-frame. A horizontally-arranged rock-shaft 52 is mounted in suitable bearings 53 in the frame, which rock-shaft is provided with an arm 54, the free end of which is inserted through an elongated slot 55 in the arm 49 of the weighted lever. This rock-shaft 52 is further provided with an arm 56, the free end of which has a pin-and-slot engagement 57 58 with a sliding rod 59, parallel with the drive-shaft 21, which rod 59 is fitted to slide in a bearing 60 on the frame. The rod 59 has a yoke connection 61 with the friction drive-wheel 34. The connection of the wheel 34 with the shaft is through a disk 62, fixed to the shaft, through which pins 63 extend parallel with the shaft from the face of the wheel. This permits the wheel to be moved along the driving-shaft 21 in engagement with the face of the friction-disk 35 toward and away from the axis of the winding-spindle 3.

I provide means for automatically shifting the driving-belt 27 from its fast pulley 24 onto the loose pulley 25 when the longitudinal winding of the ball has been completed, as follows: The belt-shifting rod, (denoted by 64,) is mounted to slide in suitable bearings 65 on the machine, the pins 66 of said rod serving to positively shift the belt 27 in one or the other direction as the rod is moved. One arm, 67, of a rocking lever has a link 68, connecting it with the belt-shifter rod 64. This rocking lever is pivoted at 69 on the machine-frame and normally tends to shift the belt from the pulley 24 to the pulley 25 by means of a spring 70, one end of which is secured to the machine-frame, and the other end of which is engaged with pins 71, depending from the arm 67 of the rocking lever. A latch 72 is hinged at 73 on the frame adjacent to the arm 67 of the rocking lever, the nose of which latch is fitted to drop by gravity over the inner edge of said arm when the arm is in such position that the driving-belt 27 is on the fast pulley 24 of the drive-shaft. A trip-rod 74 depends from the latch 72, the lower end of which rod passes through a guide 75 on the frame. The arm 49 of the ball-controlled weighted lever is provided with an arm 76, extended laterally therefrom, which arm is fitted to engage the lower end of the rod 74 as the longitudinal winding of the ball nears completion, so that the further upward movement of the arm serves to lift the latch 72 and release the belt-shifter-controlling rocking lever, permitting it to shift the belt from the fast pulley 24 onto the loose pulley 25, thus stopping the winding of the ball. This rocking lever is provided with a forwardly-extended arm 77, which engages a stop 78 on a bracket 79 at the front of the machine, serving to limit the inner movement of the arm 67, thus holding the belt-shifter, with the driving-belt, on the loose pulley 25. This rocking lever is further provided with an arm 80, which engages one arm 81 of a rocking lever pivoted at 82 in the frame, the other arm, 83, of which lever supports the free end of a worm-shaft 84. This worm-shaft 84 is driven from the stud-shaft 30 by providing the stud-shaft 30 with a pulley 85, the worm-shaft 84 with a pulley 86, and a connecting driving-band 87 for the two pulleys. The shaft 84 is provided with a worm 88, which is swung into and out of engagement with the worm-gear 89, fixed to the winding-spindle 3.

When it is desired to accomplish the end winding of the ball, the twine is removed from the guide-pulley 16 and the idler-pulley 15. It is then passed around the pulley 12 on the flier-arm 10 and from thence through the guide 11 at the end of said arm. The arm 77 of the belt-shifter-controlling lever is then disengaged from the stop 78 by springing the arm over the same, and the lever is swung in a direction to shift the driving-belt 27 from the loose pulley 25 to the loose pulley 26. Rotary movement will be thus imparted through the driving-band 28 to the stud-shaft 30. From thence a rotary movement will be imparted to the flier-spindle 5 through the band 32. A rotary movement will also be imparted to the shaft 84, the worm 88 of which has been swung into engagement with the worm-gear 89, because of the lifting of the free end of the shaft 84 by the rocking movement of the belt-shifter-controlling lever. Thus a slow rotary movement is imparted to the winding-spindle at the same time that the twine is wound endwise around the ball, it being understood that the inner and outer heads 6 and 7 are first removed from their engagement with the ends of the ball.

After the end winding of the ball has been completed the ball may be removed and the heads 6 and 7 again placed in position to confine the ends of the new ball to be wound. The twine is removed from the flier and again engaged with the pulley 15 and guide-pulley 16. The belt-shifter lever is then swung in a position to shift the driving-belt 27 onto the fast pulley 24, thus starting the rotation of the winding-spindle at a higher speed, owing to the position of the driving-wheel 34 in close proximity to the axis of the friction-disk 35 of the winding-spindle.

Because of the automatic outward shifting of the driving-wheel 34 on the friction-disk 35 as the diameter of the ball increases I am enabled to wind the smaller part of the ball very rapidly and positively and gradually decrease the speed of the winding-spindle, thus insuring an even feed of the twine to the ball.

It is evident that various changes might be resorted to in the form and arrangement of the several parts without departing from the spirit and scope of my invention. Hence I do not wish to limit myself strictly to the structure herein set forth; but

What I claim is—

1. In a ball or cop winding machine, the combination with a winding-spindle having a friction-disk thereon, a drive-shaft having a friction-wheel in engagement with the disk for positively rotating the winding-spindle and means under the control of the ball or cop being wound for moving the friction-wheel along the disk away from the axis of the winding-spindle for gradually reducing the speed of rotation of the winding-spindle.

2. In a ball or cop winding machine, the combination with a winding-spindle having a friction-disk thereon, a drive-shaft having a friction-wheel in engagement with said disk for positively rotating the winding-spindle, a vertically-sliding bar having its head in engagement with the ball or cop being wound, a weighted lever controlled by said bar and a connection between the weighted lever and the friction-wheel for gradually moving the wheel along the disk away from the axis of the winding-spindle as the bar is depressed by the winding of the ball or cop to gradually reduce the speed of rotation of the spindle.

3. In a ball or cop winding machine, the combination with a winding-spindle, a drive-shaft for rotating it having fast and loose pulleys, a driving-belt, a belt-shifter tending to shift the belt from the fast to the loose pulley, a latch for holding the shifter with the driving-belt in engagement with the fast pulley and means under the control of the ball or cop being wound to release the latch when the ball or cop reaches a predetermined size to permit the shifter to shift the belt onto the loose pulley, said means comprising a vertically-sliding rod having its head engaged with the ball or cop, a weighted lever for holding the head against the ball or cop, a rod depending from the latch and an arm carried by the lever arranged to engage the said rod.

4. In a ball or cop winding machine, a winding-spindle, a drive-shaft for positively rotating it having fast and loose pulleys, a flier-spindle, arranged obliquely to the winding-spindle, means connected to a loose pulley on the drive-shaft for rotating the flier-spindle and winding-spindle independently of the drive-shaft.

5. In a ball or cop winding machine, the combination with a winding-spindle, a drive-shaft for rotating it having fast and loose pulleys, a flier-spindle arranged obliquely to the winding-spindle, means connecting the flier-spindle with a loose pulley and the winding-spindle with said loose pulley, a driving-belt and a belt-shifter for shifting the driving-belt onto and off from the loose pulley for controlling the operation of the winding and flier spindles independently of the drive-shaft.

6. In a ball or cop winding machine, the combination with a winding-spindle, a drive-shaft for rotating it having fast and loose pulleys, a driving-belt, a belt-shifter, a controlling-lever therefor, a worm-shaft arranged to be brought into and out of driving connection with the winding-spindle by the controlling-lever and a driving connection between a loose pulley and worm-shaft for rotating the winding-spindle independently of the drive-shaft.

7. In a ball or cop winding machine, a drive-shaft, a winding-spindle driven thereby, a flier-spindle arranged obliquely to the winding-spindle, a loose pulley on the drive-shaft connected thereto, a second loose pulley and a fast pulley on the drive-shaft, a driving-belt, means for automatically shifting the belt from the fast to the second-named loose pulley for stopping the rotation of the winding-spindle and means for shifting the belt to the first-named loose pulley for rotating the flier-spindle and also for rotating the winding-spindle at a lower speed than its speed when driven by the drive-shaft.

8. In a ball or cop winding machine, a drive-shaft, a winding-spindle driven thereby, a flier-spindle, arranged obliquely to the winding-spindle, a worm-shaft arranged to be brought into and out of engagement with the winding-spindle, a stud-shaft, a loose pulley on the drive-shaft, a connection between the loose pulley and the stud-shaft, the flier-spindle and the stud-shaft and the worm-shaft and stud-shaft, a second loose pulley and a fast pulley on the drive-shaft, a driving-belt, means for automatically shifting the driving-belt from the fast pulley to the second-named loose pulley and means for shifting the belt from the second-named loose pulley to the first-named loose pulley for driving the flier-spindle and the winding-spindle independently of the drive-shaft.

9. In a ball or cop winding machine, a winding-spindle, a flier-spindle arranged obliquely thereto, means for positively rotating the winding-spindle, a twine-guide arranged to travel back and forth parallel with the winding-spindle for producing the longitudinal wind of the ball or cop, a guide carried by the flier-spindle for producing the end wind of the ball or cop and means for rotating the flier-spindle.

In testimony that I claim the foregoing as my invention I have signed my name, in presence of two witnesses, this 29th day of April, 1904.

JOHN GOOD.

Witnesses:
    FREDK. HAYNES,
    HENRY THIEME.